(12) United States Patent
Lee et al.

(10) Patent No.: US 7,400,946 B2
(45) Date of Patent: Jul. 15, 2008

(54) METHOD AND APPARATUS FOR MEASURING VELOCITY OF LAND VEHICLE USING ACCELEROMETER AND ROUTE GUIDANCE INFORMATION DATA

(75) Inventors: Kook-Yeon Lee, Suwon-si (KR); Hyun-Suk Min, Seoul (KR); Hyun-Su Hong, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 783 days.

(21) Appl. No.: 10/864,009

(22) Filed: Jun. 9, 2004

(65) Prior Publication Data

US 2005/0119798 A1    Jun. 2, 2005

(30) Foreign Application Priority Data

Dec. 1, 2003    (KR) ............. 10-2003-0086438

(51) Int. Cl.
*G06F 11/00* (2006.01)
(52) U.S. Cl. .................................. 701/1; 342/104
(58) Field of Classification Search .......... 701/1, 701/71, 75, 82, 89, 207; 342/357.11, 104, 342/106; 356/27
See application file for complete search history.

(56) References Cited

U.S. PATENT DOCUMENTS

| | | | | |
|---|---|---|---|---|
| 5,187,977 | A | * | 2/1993 | Koschorek et al. ............. 73/146 |
| 5,828,987 | A | * | 10/1998 | Tano et al. ................. 702/150 |
| 6,115,668 | A | * | 9/2000 | Kaneko et al. .............. 701/207 |
| 6,157,342 | A | * | 12/2000 | Okude et al. ........... 342/357.13 |
| 6,675,074 | B2 | * | 1/2004 | Hathout et al. ................. 701/1 |
| 6,959,240 | B2 | * | 10/2005 | Okamoto .................... 701/70 |

\* cited by examiner

*Primary Examiner*—Dalena Tran
(74) *Attorney, Agent, or Firm*—The Farrell Law Firm, PC

(57) ABSTRACT

A method and apparatus for measuring the velocity of a vehicle are provided. An acceleration measurement received from an accelerator and RGI data received from an external information server are stored and an irregularity constant of the accelerator is determined. It is determined whether the vehicle is in a stationary state by analyzing the acceleration measurement. If the vehicle is not in the stationary state, the inclination angle of a road on which the vehicle is traveling is calculated using a plurality of three-dimensional shape points included in the RGI data. A gravity acceleration component is compensated for from the acceleration measurement using the road inclination angle. The velocity of the vehicle is calculated using the compensated acceleration measurement.

13 Claims, 8 Drawing Sheets

GRAVITY COMPONENT DETECTION

METHOD AND APPARATUS FOR MEASURING VELOCITY OF LAND VEHICLE USING ACCELEROMETER AND ROUTE GUIDANCE INFORMATION DATA

PRIORITY

This application claims priority under 35 U.S.C. § 119 to an application entitled "Method and Apparatus for Measuring Velocity of Land Vehicle Using Accelerometer and Route Guidance Information Data" filed in the Korean Intellectual Property Office on Dec. 1, 2003 and assigned Serial No. 2003-86438, the contents of which are incorporated herein by reference.

BACKGROUND OF THE INVENTION

1. Field of the Invention

The present invention relates generally to a method and apparatus for measuring the velocity of a land vehicle, and in particular, to a method and apparatus for measuring the velocity of a land vehicle using an accelerometer and RGI (Route Guidance Information) data.

2. Description of the Related Art

In general, vehicles, such as aircraft, ship, land vehicle, etc., are equipped with navigation systems for positioning the vehicles and providing destination routing. To position a vehicle and provide a route to a destination, a navigation system must decide the position of the vehicle accurately.

Therefore, the navigation system is usually provided with a measuring device for determining its own position. The measuring device can determine the position using an external aid, or using an internal sensor. An example of the case of the external aid is a GPS (Global Positioning System), and an example of the case of the internal sensor is a DR (Dead Reckoning) system using an inertial sensor.

The DR system with an inertial sensor or an Inertial Navigation System (INS) is a navigation system first developed by the Massachusetts Institute of Technology (MIT) in the U.S. in the early 1950s and deployed for practical use in the 1960s. The INS calculates the velocity and position of a vehicle using a gyroscope for sensing rotation and an accelerometer for sensing linear movement.

The basic operational principle of the INS may be summarized as follows. The INS first calculates the vehicle direction (angle) of a vehicle by integrating angular velocities output from the gyroscope, compensates the output of the accelerator for the gravity acceleration, and integrates the compensated accelerator outputs. Thus, the INS autonomously calculates the current velocity and position of the vehicle. While the INS advantageously provides accurate and continuous navigation data for a short term, errors are accumulated over time due to the integration. Therefore, a very expensive accurate gyroscope and accelerator are required to implement the INS. To ensure higher accuracy and long-term stability, the INS is usually used in conjunction with a non-inertial auxiliary sensor such as a magnetic compass and the GPS rather than independently.

As described above, the velocity of a vehicle is calculated by combining velocity information from an accelerator with the vehicle direction information from a gyroscope. Accurate calculation of the velocity of the vehicle in a three-dimensional space requires three one-axis gyroscopes arranged perpendicular to one another and three one-axis accelerators, also arranged perpendicular to one another. Yet, the vehicle velocity can be obtained with the use of fewer sensors according to the type of the vehicle. For example, in the case of a land vehicle, since the rolling of a shaft connecting the front to the rear of the land vehicle and its linear movement in a perpendicular direction to a road surface are negligible, as many sensors as used to sense the rolling and linear movement can be saved.

To calculate a velocity vector of a vehicle traveling on a road, the DR system with an inertial sensor must measure the direction of the vehicle and the velocity of the vehicle in a direction of motion. A gyroscope on an axis perpendicular to the plane of a vehicle shaft is required to measure the direction of the vehicle. Also, to measure the velocity of the vehicle along the direction of motion, the inclination angle of the road must be measured in addition to the use of an accelerator installed in the direction of the vehicle shaft.

The reason for measuring the inclination angle of the road in calculating the velocity vector of the vehicle in the DR system is to calculate the gravity acceleration involved in the output of the accelerator from the road inclination angle. That is, because the gravity acceleration is applied in a direction perpendicular to the surface of the elliptical earth (the surface of a sphere perpendicular to the gravity acceleration), if the axis of direction of the accelerator, fixed in a predetermined direction on the vehicle, is changed due to a change in the road inclination angle, a gravity acceleration component in the output of the accelerator is also changed. Therefore, the pure motion acceleration of the vehicle is achieved only when the gravity acceleration, varying with the road inclination angle, is removed from the output of the accelerator. However, because the motion acceleration in the direction of motion and the gravity acceleration component cannot be distinguished from each other without knowledge of the road inclination angle, an error of the gravity acceleration component is involved in measuring the velocity of the mobile terminal.

FIG. 1 illustrates compensation of a vehicle accelerator output for the gravity force. Referring to FIG. 1, a road inclination angle is defined as an angle from a plane 10 perpendicular to the direction of the gravity acceleration (±g). In FIG. 1, the road inclination angle is an angle θ between the gravity acceleration direction ±g plane 10 and a plane 20 extended in the direction of motion of a vehicle 30.

As the vehicle 30 travels on the plane 20 inclined at the angle θ with respect to a plane 10 perpendicular to the gravity acceleration direction ±g, a measurement $\vec{a}$ from an accelerator provided in the vehicle 30 is determined by Equation (1)

$$\vec{a} = \vec{r}\vec{a} + \vec{g} \tag{1}$$

The measurement $\vec{a}$ includes an actual acceleration component $\vec{r}a$ and a gravity acceleration component $\vec{g}$. This gravity acceleration component, $\vec{g}$, which is measured together with a variation in an actual velocity, is an error factor for velocity measuring.

Hence, the vehicle DR system must subtract the gravity acceleration $\vec{g}$ from the acceleration measurement $\vec{a}$ to measure an accurate velocity of the vehicle and the road inclination angle is required to measure the gravity acceleration $\vec{g}$. To this end, the DR system must be additionally equipped with a gyroscope or a clinometer.

Traditionally, a gyroscope is responsible for measuring a road inclination angle. Therefore, the vehicle-DR system uses two or more gyroscopes: one for deciding the direction of a vehicle and another for calculating the road inclination angle. Since the gyroscopes are basically sensors for measuring variations, the vehicle DR system, which measures the road inclination angle using a gyroscope, integrates the outputs of the gyroscope to obtain the road inclination angle. Therefore, an error component of the gyroscope is integrated in the integration process, thereby accumulating errors over time in estimating the road inclination angle.

To calculate the road inclination angle, thus, the gyroscope is used not alone, but in conjunction with an auxiliary sensor without errors being accumulated. Although a sensor such as a clinometer can be adopted to calculate the accurate road inclination angle, an existing accelerator is generally used as the auxiliary sensor to minimize the number of sensors used.

FIG. 2 illustrates an operation for measuring a gravity component from the output of an accelerator in a conventional system. Referring to FIG. 2, the conventional system measures a relatively low-frequency gravity acceleration component (a) by passing the output of an accelerator including the gravity acceleration component (a) and an actual acceleration component (b) through a low pass filter (LPF) 40, and calculates a road inclination angle using the gravity acceleration component (a).

Despite the advantage that no errors are accumulated in the road inclination angle information, however, this method is sensitive to the performance of the accelerator and insensitive to the change of the inclination angle. Moreover, the use of a low cut-off frequency to separate the gravity component leads to a time delay.

As described above, the conventional vehicle DR system uses an additional gyroscope for estimating a road inclination angle because the road inclination angle cannot be calculated only using an accelerator. However, the addition of an expensive gyroscope to the DR system makes it impossible to realize a low-price DR velocity measuring device.

SUMMARY OF THE INVENTION

An object of the present invention is to substantially solve at least the above problems and/or disadvantages and to provide at least the advantages below. Accordingly, an object of the present invention is to provide an apparatus and method for implementing a low-price Dead Reckoning (DR) velocity measuring device using an accelerator and Route Guidance Information (RGI) data.

Another object of the present invention is to provide an apparatus and method for calculating the inclination angle of a road on which a vehicle is traveling using shape points included in the RGI data, and measuring a gravity acceleration component included in an acceleration component of the vehicle using the road inclination angle.

A further object of the present invention is to provide an apparatus and method for measuring a gravity acceleration component using an accelerator and the RGI data and measuring the velocity of a vehicle using the gravity acceleration component.

The above objects are achieved by providing a method and apparatus for measuring the velocity of a vehicle are provided. According to one aspect of the present invention, in a method of measuring the velocity of a vehicle, an acceleration measurement received from an accelerator and RGI data received from an external information server are stored and an irregularity constant of the accelerator is determined. It is determined whether the vehicle is in a stationary state by analyzing the acceleration measurement. If the vehicle is not in the stationary state, the inclination angle of a road on which the vehicle is traveling is calculated using a plurality of three-dimensional shape points included in the RGI data. A gravity acceleration component is compensated for from the acceleration measurement using the road inclination angle. The velocity of the vehicle is calculated using the compensated acceleration measurement.

According to another aspect of the present invention, in an apparatus for measuring the velocity of a vehicle, an acceleration measurer measures a current acceleration of the vehicle through an accelerator mounted on the vehicle, an acceleration storage stores an acceleration measurement received from the acceleration measurer according to measured time, a gravity acceleration compensator calculates the inclination angle of a road on which the vehicle is traveling using a plurality of three-dimensional shape points included in the RGI data received from an external server and compensates for a gravity acceleration component from the acceleration measurement using the road inclination angle, and a velocity calculator calculates the velocity of the vehicle using the compensated acceleration measurement.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
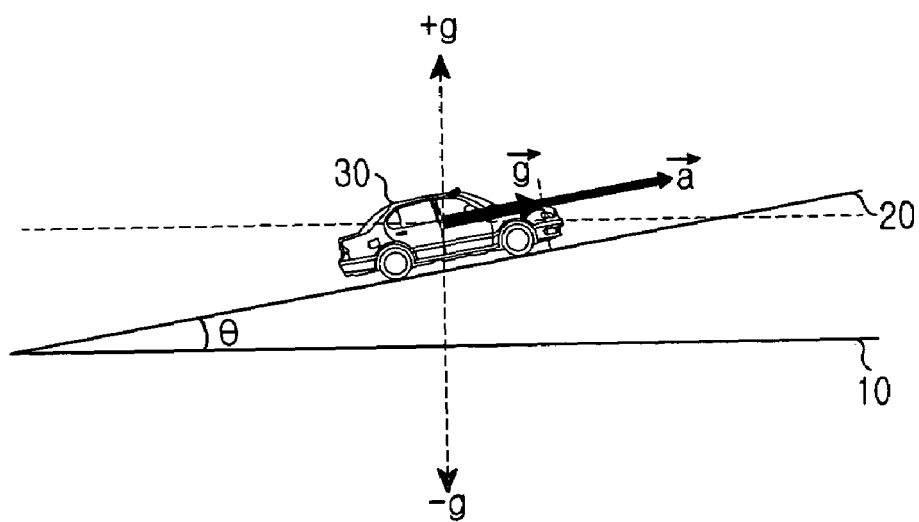
FIG. 1 is a diagram illustrating compensation of accelerator output for gravity.
Figure 2:
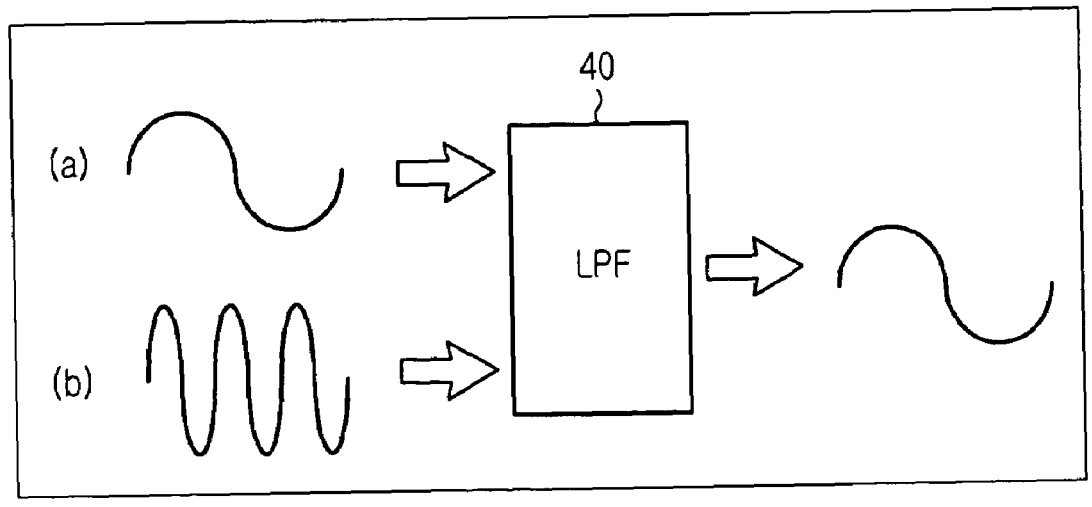
FIG. 2 is a diagram illustrating an operation for measuring a gravity component from accelerator output according to a conventional method.
Figure 3:
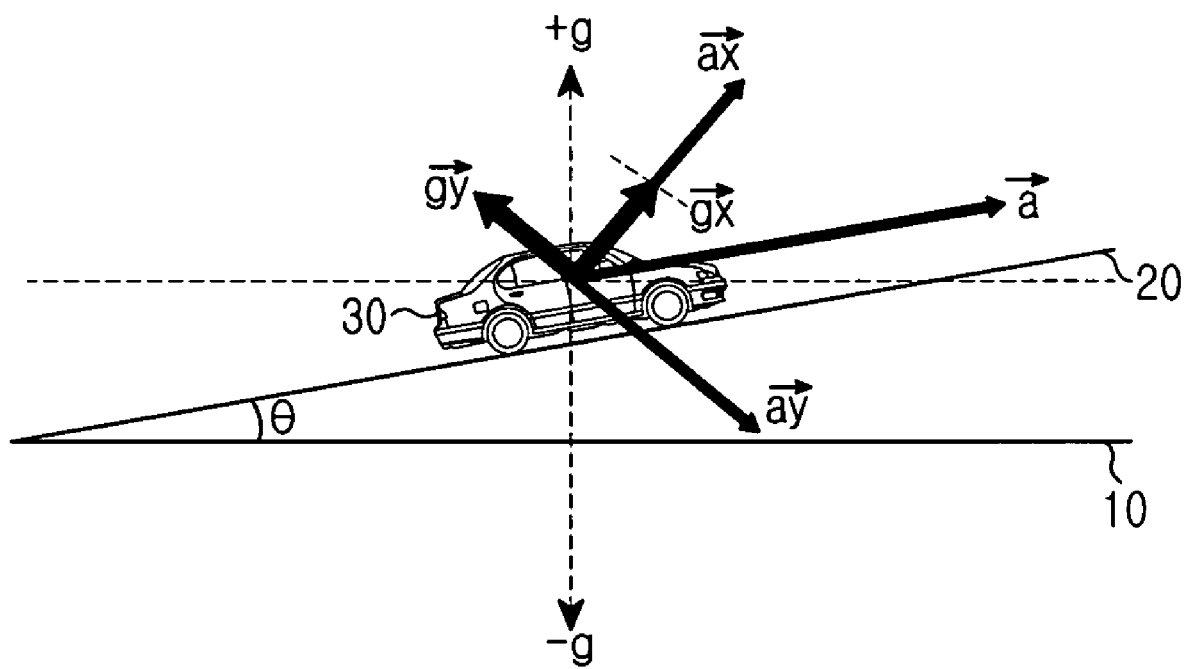
FIG. 3 is a diagram illustrating compensation of accelerator output for gravity using information about an accelerator.

FIG. 3 illustrates the concept of compensation for gravity in the output of an accelerator using information about the accelerator. Referring to FIG. 3, if a vehicle is equipped with an accelerator, the effects of gravity acceleration on acceleration measured in the accelerator along with the movement of the vehicle, can be known. When the vehicle 30 travels on a road 20 inclined at an angle θ with the plane 10 perpendicular to the gravity acceleration direction ±g, the acceleration $\vec{a}$ measured in the accelerator contains the gravity acceleration $\vec{g}$. Hence, to measure the velocity of the vehicle 30, the gravity acceleration component $\vec{a}$ must be eliminated from the acceleration $\vec{a}$. For this purpose, knowledge of a road inclination angle must be gained.

A navigation system is typically comprised of a server and a terminal. The server transmits RGI data to the terminal mounted on a vehicle, and the terminal provides a route guidance service to a user based on the RGI data. The RGI data includes the coordinates of the road on which the vehicle is traveling.

The present invention pertains to an apparatus and method for accurately measuring the velocity of a vehicle by measuring the inclination angle of a road on which the vehicle is moving using the coordinates of the road included in the RGI data, compensating for a gravity acceleration component in an acceleration measurement of an accelerator using the road inclination angle. The navigation system will be described below.

Figure 4:
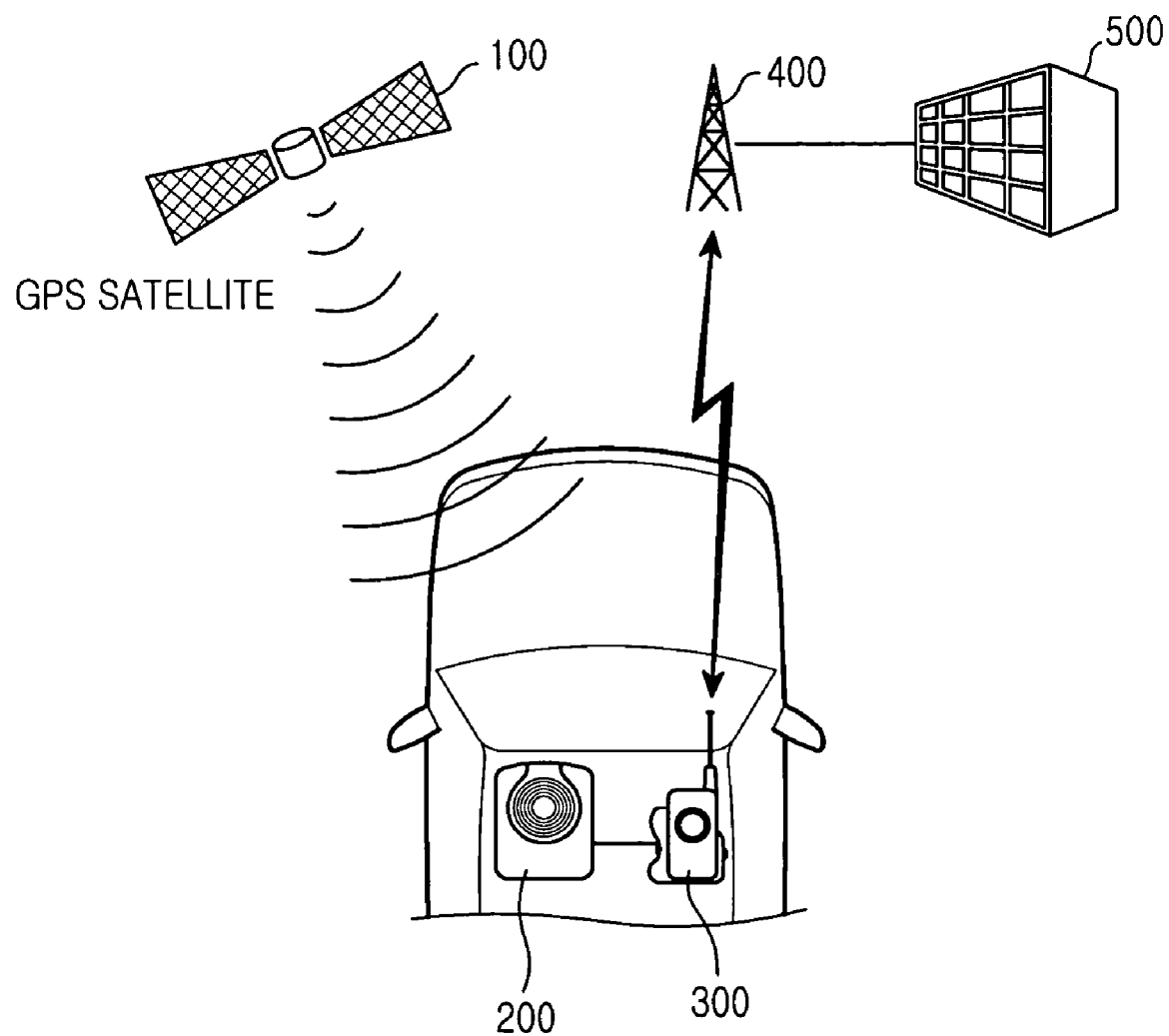
FIG. 4 is a diagram illustrating the configuration of a navigation system of the present invention.

FIG. 4 illustrates the configuration of the navigation system. Referring to FIG. 4, the navigation system includes a GPS satellite 100, a mobile terminal 300 for communicating with a radio network 400, a navigation terminal 200 for exchanging information with the GPS satellite 100 and the mobile terminal 300 to provide a driver with information about the present position and traveling of a vehicle, and an information center 500 connected to the radio network 400, for providing information required for route guidance to the navigation terminal 200. The navigation terminal 200 and the mobile terminal 300 are mounted on the vehicle in FIG. 4, by way of example.

Figure 5:
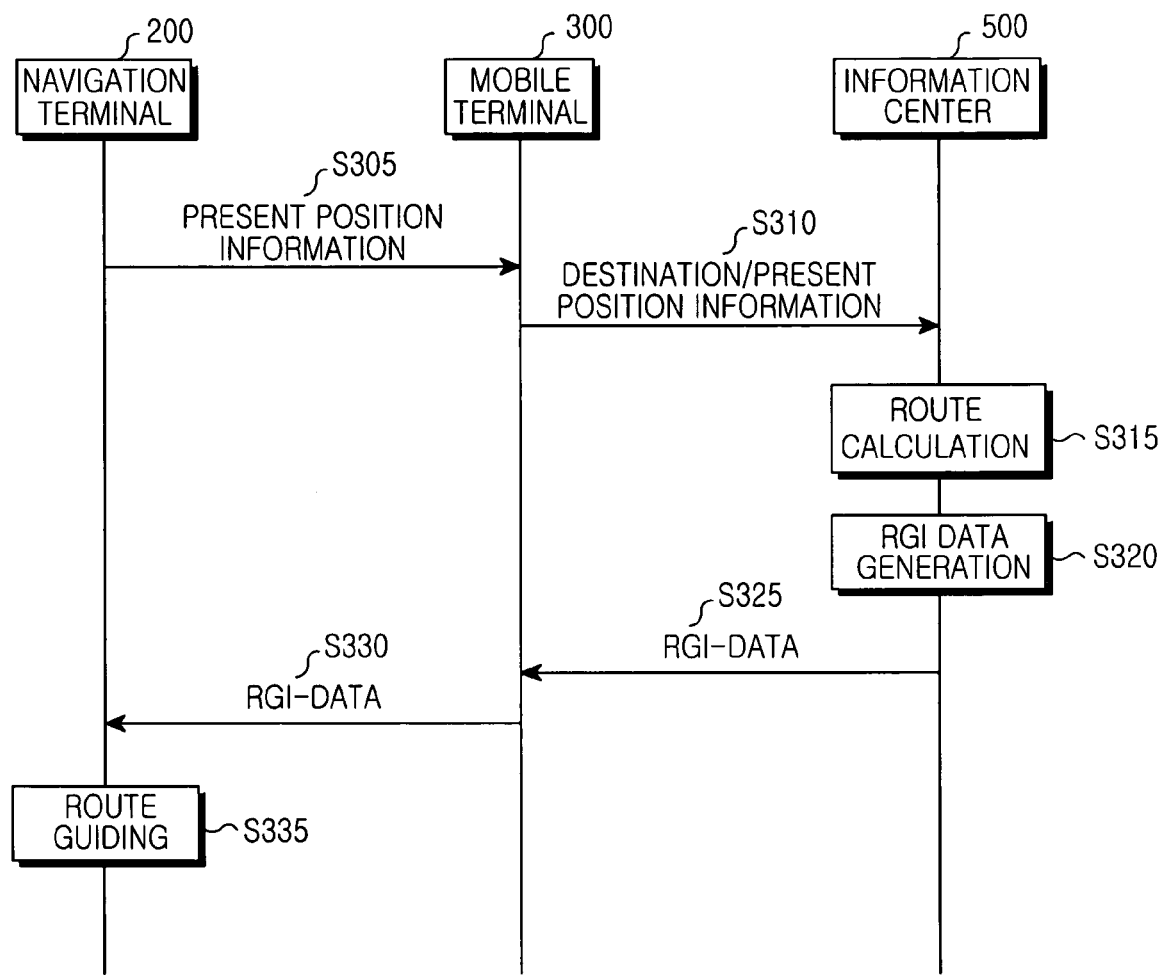
FIG. 5 is a diagram illustrating a signal flow for route guidance in the navigation system of the present invention.

FIG. 5 is a diagram illustrating a signal flow for route guidance in the navigation system. Referring to FIG. 5, if the navigation terminal 200 transmits information about the present position of the vehicle in step S305, the mobile terminal 300 transmits the present position information and information about a destination, e.g., entered by the driver, to the information center 500, requesting routing from the present position to the destination, in step S310. The information center 500 calculates a route based on the destination and present position information in step S315 and generates RGI data corresponding to the calculated route in step S320. The information center 500 then transmits the RGI data to the navigation terminal 200 through the mobile terminal 300 in steps S325 and S330. The navigation terminal 200 provides the route guidance service to the driver based on the RGI data in step S335.

Figure 6:
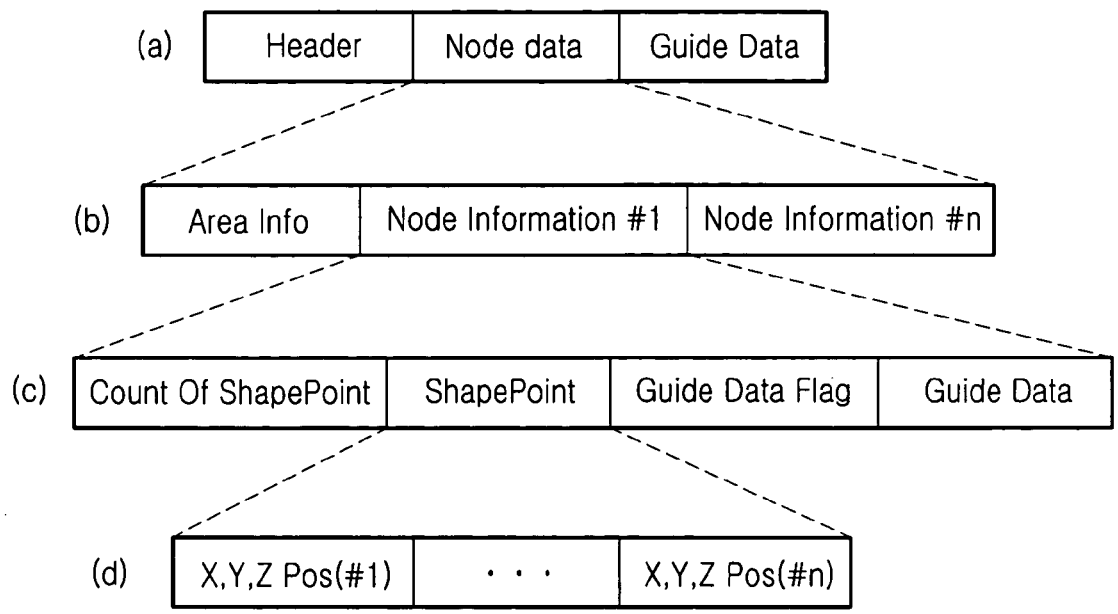
FIG. 6 is a diagram illustrating the format of Route Guidance Information (RGI) data transmitted for route guidance in the navigation system of the present invention.

FIG. 6 illustrates the format of the RGI data transmitted for route guidance in steps S325 and S330. As denoted by reference character (a), the RGI data format includes a Header field for storing header information therein, a Node Data field for storing position information associated with a predetermined area therein, and a Guide Data field for storing route guidance information for the predetermined area therein. The Node Data field includes an Area Info field and a Node Information fields #1 to #n for the area, as denoted by reference character (b). Each Node Information includes a Count of Shape Point field, a ShapePoint field, a Guide Data Flag field, and a Guide Data field, as denoted by reference character (c). The ShapePoint field includes the (x, y, z) coordinates of predetermined points, as denoted by reference character (d).

In accordance with the present invention, the ShapePoint field is used to compensate for a gravity acceleration component in an acceleration measurement.

Figure 7:
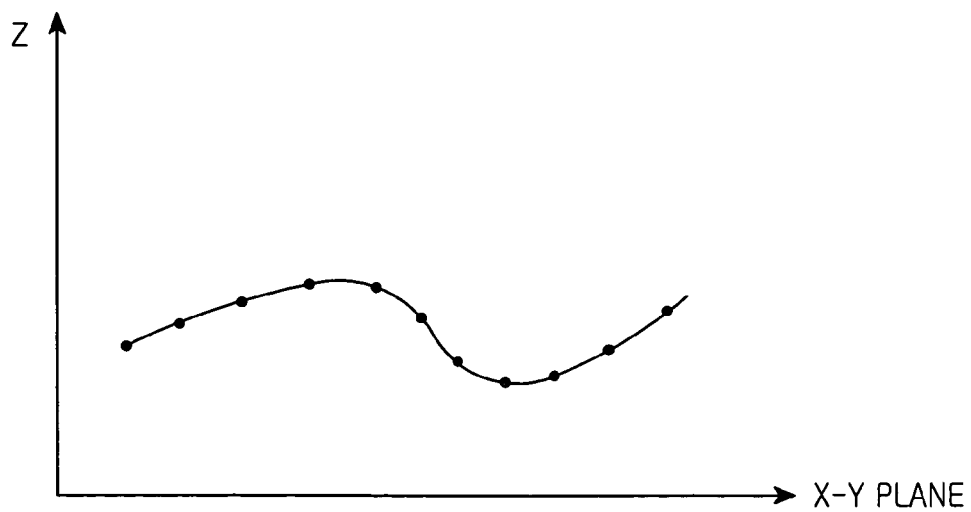
FIG. 7 is a graph illustrating the shape points included in the RGI data in accordance with the present invention.

FIG. 7 conceptually illustrates shape points included in the RGI data. Referring to FIG. 7, a plurality of shape points exist between an x-y plane and a z axis. The shape points illustrated in FIG. 7 are points where the sign of an inclination angle obtained using the x-y plane and altitude information along the z axis is changed or the inclination angle exceeds a threshold. For example, let the x-y plane be the earth's surface. Then, the z axis represents altitudes. Consequently, a shape point is a point where an ascending road starts to descend, or vice versa, or a road inclination varies greatly. The shape points are usually derived from three-dimensional aerial photograph data.

Figure 8:
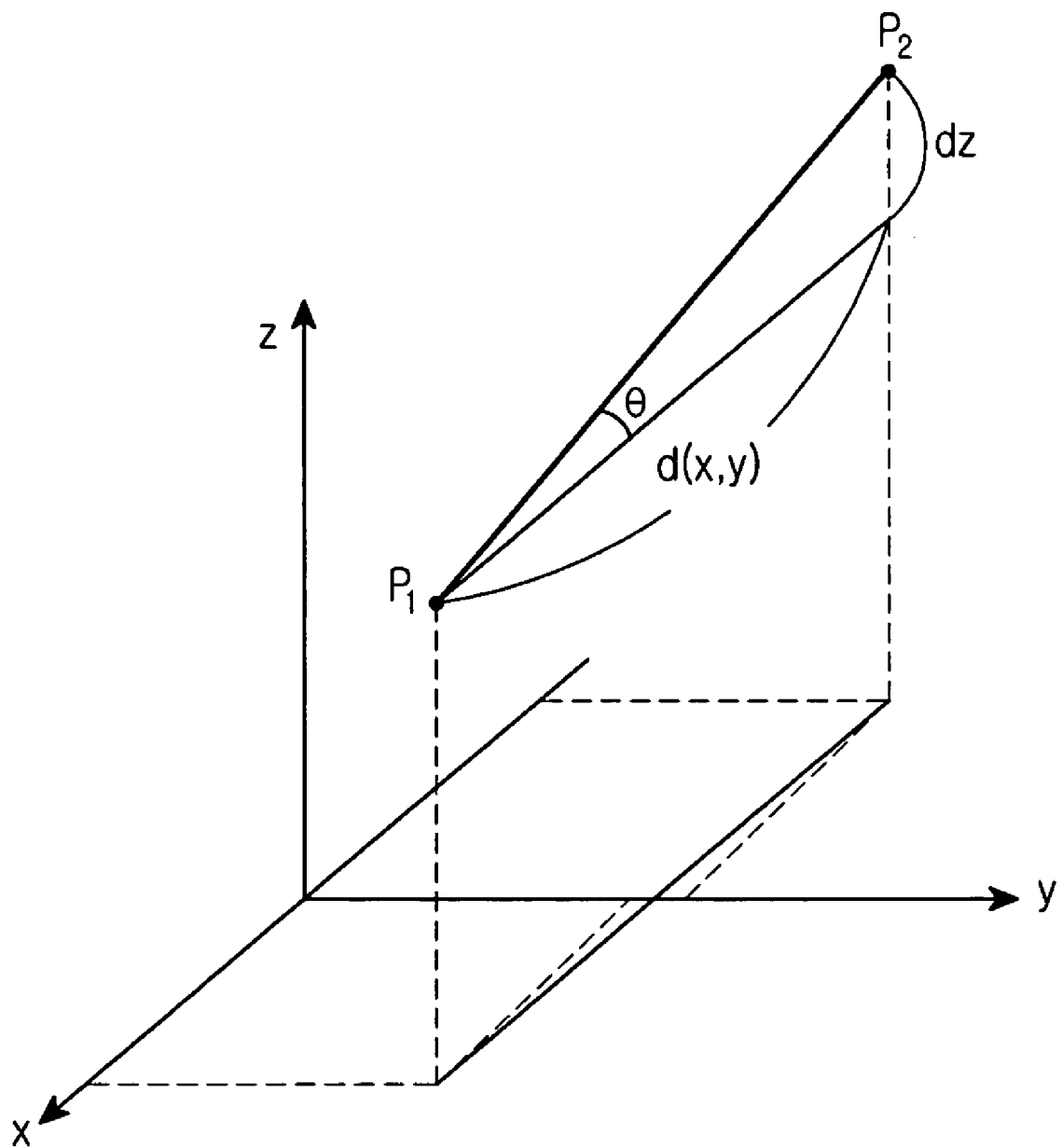
FIG. 8 illustrates calculation of a road inclination angle using shape points according to an embodiment of the present invention.

FIG. 8 illustrates the concept of calculating a road inclination angle using shape points according to an embodiment of the present invention. As illustrated in FIG. 6, the shape points are included in the RGI data. The shape points illustrated in FIG. 7 are shown in FIG. 8 in three-dimensions.

Lets denote one shape point (a second shape point) by $P_2$ at coordinates $(x_2, y_2, z_2)$ in the direction of motion of a vehicle and the previous shape point (a first shape point) by $P_1$ at coordinates $(x_1, y_1, z_1)$. Then $d(x, y)$ is calculated according to Equation (2)

$$d(x,y)=\sqrt{(x_2-x_1)^2+(y_2-y_1)^2} \quad (2)$$

and dz is calculated according to Equation (3)

$$dz=z_2-z_1 \quad (3)$$

Thus, the road inclination angle θ is determined according to Equation (4)

$$\tan\theta = \frac{dz}{d(x,y)} \quad (4)$$
$$= \frac{(z_2-z_1)}{\sqrt{(x_2-x_1)^2+(y_2-y_1)^2}}$$
$$\theta = \arctan\left(\frac{(z_2-z_1)}{\sqrt{(x_2-x_1)^2+(y_2-y_1)^2}}\right)$$

which is a formula for calculating θ for $z_2 \geq z_1$. If $z_2 < z_1$, according to Equation (5) θ is $$\theta = -\arctan\left(\frac{(z_1-z_2)}{(x_2-x_1)^2+(y_2-y_1)^2}\right) \quad (5)$$

Figure 9:
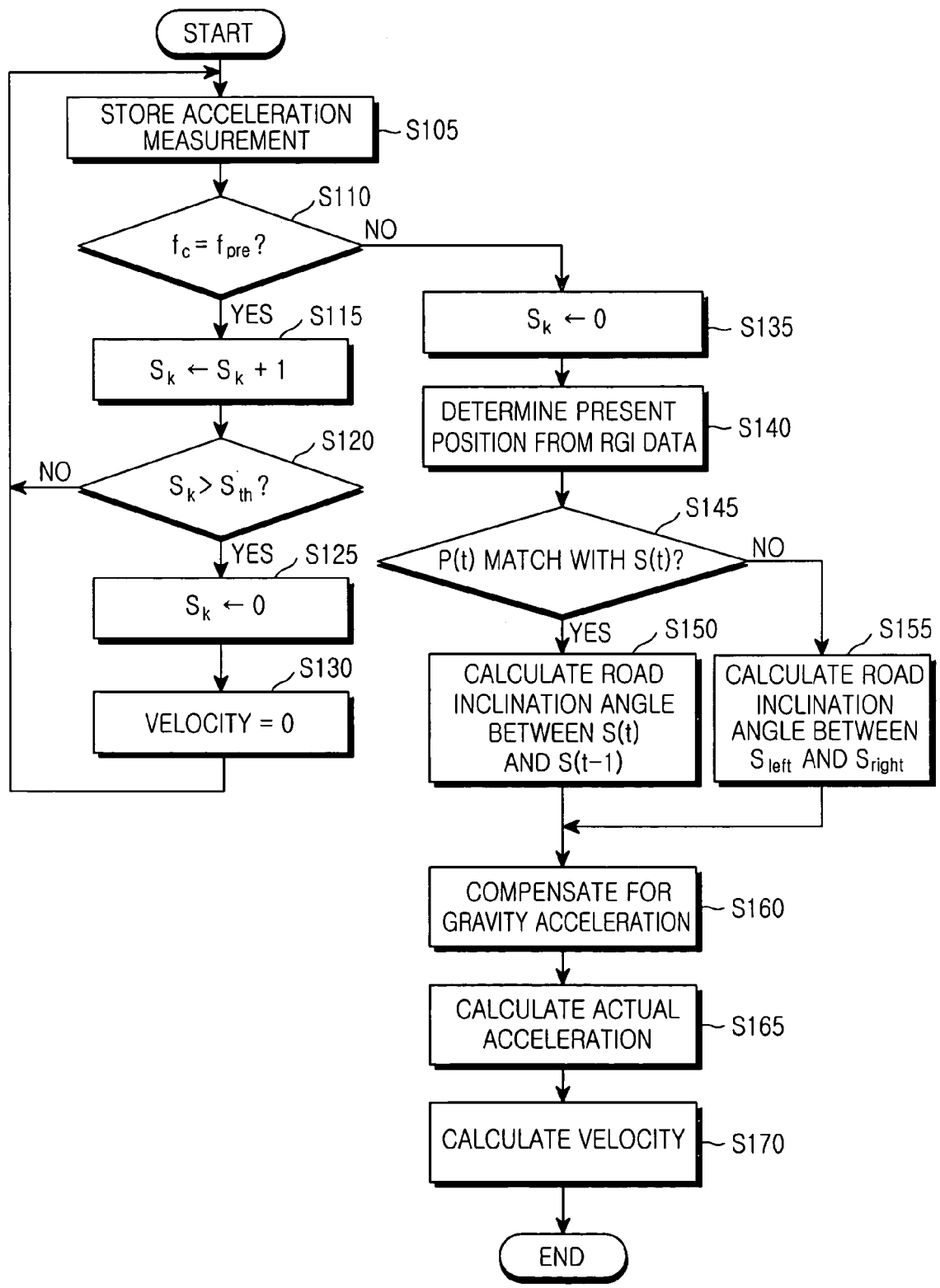
FIG. 9 is a flowchart illustrating a method of measuring the velocity of a vehicle according to the embodiment of the present invention.

FIG. 9 is a flowchart illustrating a method of measuring the velocity of a vehicle according to the embodiment of the present invention. In accordance with the velocity measuring method, the inclination angle of a road on which the vehicle is traveling is calculated, a gravity acceleration component is compensated for from measurement data derived from an accelerator using the road inclination angle, and the velocity of the vehicle is measured using the compensated measurement data.

Referring to FIG. 9, a vehicle velocity measuring apparatus of the present invention stores measurement data received from the accelerator in step S105. The measurement data of the accelerator is typically expressed according to Equation (6) as $$f = A + G + B = a\cos\alpha + g\sin(\alpha+\theta) + B \qquad (6)$$

where f is the measurement data from the accelerator, a is an actual acceleration of the vehicle, g is a gravity acceleration, and B is an irregularity constant for the accelerator in a stationary state. The irregularity constant is defined as a constant that varies each time a system power voltage is applied. It is different for each sensor. Once the irregularity constant is set, it is maintained unchanged until application of the next power voltage. In the present invention, the irregularity constant is obtained empirically or by computation. A process of obtaining B will not be described herein.

The velocity measuring apparatus determines whether the vehicle is in the stationary state by comparing current measurement data $f_c$ with previous measurement data $f_{pre}$ from the accelerator in step S110. If $f_c$ is equal to $f_{pre}$, the velocity measuring apparatus considers that the vehicle is in the stationary state.

However, it may occur that $f_c$ and $f_{pre}$ are equal instantaneously due to a sensor error in the accelerator or environmental factors even if the vehicle is moving. They are also equal in the case where the vehicle has been moving at a uniform velocity.

To avoid the wrong decision of determining the vehicle in the stationary state in the above cases, steps S115 and S120 are preferably performed to determine whether the vehicle is actually in the stationary state. If $f_c$ is equal to $f_{pre}$ in step S110, the velocity measuring apparatus counts the number $S_k$ of successive occurrences of $f_c$ being equal to $f_{pre}$ in step S115 and compares $S_k$ with a predetermined threshold $S_{th}$ in step S120. Only if $S_k$ is greater than $S_{th}$, the velocity measuring apparatus considers that the vehicle is actually in the stationary state. If $S_k$ is less than or equal to $S_{th}$, the velocity measuring apparatus considers that the vehicle is not actually in the stationary state. Particularly, when the vehicle has been moving at a uniform velocity, $S_k$ cannot reach $S_{th}$ due to the state of a road surface, the change of ambient temperature, and the change of a road inclination angle. Therefore, steps S115 and S120 prevent the movement of the vehicle at a uniform velocity from being mistaken for the vehicle being in the stationary state.

If it turns out that the vehicle actually is in the stationary state in steps S110 to S120, the velocity measuring apparatus sets $S_k$ to an initial value "0" in step S125 and determines the velocity of the vehicle as "0" in step S130.

If it is determined that the vehicle is in the stationary state, that is, the vehicle is moving in step S110, the velocity measuring apparatus sets $S_k$ to the initial value "0" in step S135 and determines the present position of the vehicle from RGI data received from a server in the navigation system in step S140. That is, the velocity measuring apparatus determines the present position of the vehicle on the RGI data by projecting the present position of the vehicle into the RGI data. The velocity measuring apparatus determines whether the present position P(t) of the vehicle on the RGI data matches with any S(t) of shape points included in the RGI data in step S145.

If P(t) matches with S(t), a road inclination angle is calculated using the (x, y, z) coordinates of the shape point S(t) and the previous shape point S(t-1) in step S150. That is, the road inclination angle between S(t) and S(t-1) is calculated. On the other hand, if P(t) does not match with any of the shape points, the road inclination angle is calculated using the (x, y, z) coordinates of left and right shape points $S_{left}$ and $S_{right}$ of the present position P(t) in step S155. That is, the road inclination angle between the left shape point $S_{left}$ of P(t) and the right shape point $S_{right}$ of P(t). How the road inclination angle between shape points were described beforewith reference to FIG. 8. That is, the road inclination angle θ between the shape points are computed by substituting their coordinates into Equation (4) or Equation (5).

To calculate the road inclination angle, the velocity measuring apparatus must receive RGI data from the server in the navigation system, though the RGI reception step is not shown.

After step S150 or S155, the velocity measuring apparatus compensates for a gravity acceleration component from measurement data f of the accelerator using the road inclination angle and the irregularity constant B of the accelerator obtained empirically or calculated in step S160.

To compensate for the gravity acceleration component, B is first subtracted from f, resulting in the difference $\hat{f}$. Thus, from Equation (6), $\hat{f}$ is expressed according to Equation (7) as $$f - B = \hat{f} = a\cos\alpha + g\sin(\alpha+\theta) \qquad (7)$$

The road inclination angle θ was calculated in step S150 or S155 and an angle α, at which the accelerator is installed, is already known. Therefore, by substituting θ and a into Eq. (7) and transposing a cos α, the gravity acceleration component is compensated for from measurement data from the accelerator. A formula of compensating the measurement data for the gravity acceleration component is given according to Equation (8) as $$a\cos\alpha = \hat{f} - g\sin(\alpha+\theta) \qquad (8)$$

In step S165, the actual acceleration a of the vehicle is calculated according to Equation (9) represented from Equation (8).

$$a = \frac{\hat{f} - g\sin(\alpha+\theta)}{\cos\alpha} \qquad (9)$$

The velocity V of the vehicle is computed by integrating the acceleration a in step S170 according to Equation (10)

$$V = \int a \, dt \qquad (10)$$

Figure 10:
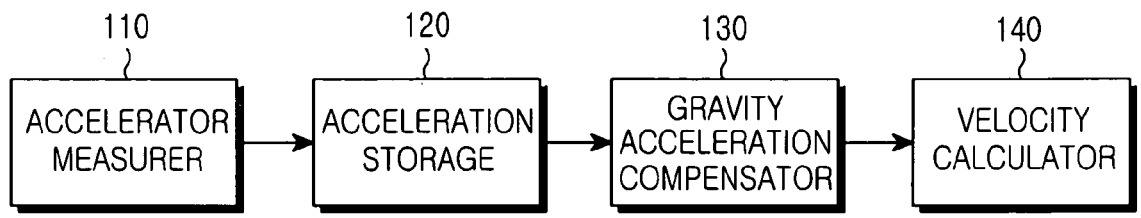
FIG. 10 is a block diagram of an apparatus for measuring the velocity of a vehicle according to the embodiment of the present invention.

FIG. 10 is a block diagram of the velocity measuring apparatus according to the embodiment of the present invention. Referring to FIG. 10, the velocity measuring apparatus 100 comprises an accelerator measurer 110, an accelerator storage 120, a gravity acceleration compensator 130, and a velocity calculator 140. The acceleration measurer 110 measures the current acceleration of a vehicle through an accelerator mounted on a vehicle. The acceleration storage 120 stores the measurement data received from the velocity measurer 110.

The gravity acceleration compensator 130 compensates the measurement data for a gravity acceleration. That is, the gravity acceleration compensator 130 calculates the inclination angle θ of a road on which the vehicle is traveling using RGI data received from a server in the navigation system, calculates the gravity acceleration component included in the measurement data using the road inclination angle θ, and compensates for the gravity acceleration component from the measurement data. In other words, the gravity acceleration component is eliminated from the measurement data.

The velocity calculator 140 calculates the velocity of the vehicle using the actual acceleration value of the vehicle received from the gravity acceleration compensator 130. The gravity acceleration compensator 130 and the velocity calculator 140 operate as illustrated in FIG. 9. Particularly, the method of calculating the velocity of the vehicle using its acceleration is illustrated in Equation (10).

Figure 11:
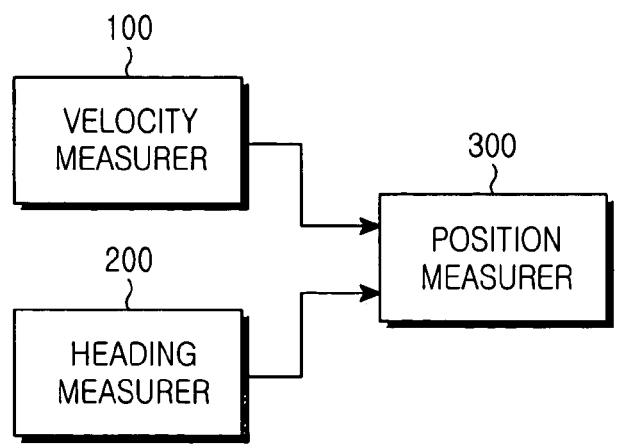
FIG. 11 is a block diagram of a present position detector in a vehicle navigation system to which the velocity measuring apparatus according to the embodiment of the present invention is applied.

FIG. 11 is a block diagram of a present position measurer for a vehicle navigation system to which the velocity measuring apparatus 100 (equivalent to a velocity measurer, herein) is applied. Referring to FIG. 11, the vehicle navigation system includes the velocity measurer 100, a direction measurer 200, and a position measurer 300. The position measurer 300 receives information about the velocity of the vehicle from the velocity measurer 100 and information about the direction of the vehicle from the direction measurer 200. Based on the received information, the position measurer 300 accurately calculates the present position of the vehicle.

In accordance with the present invention as described above, the inclination angle of a road on which a vehicle is moving is calculated using two shape points in a three-dimensional space included in RGI data and a gravity acceleration component is compensated for from measurement data from an accelerator using the road inclination angle in a navigation system. Therefore, a vehicle velocity measuring apparatus can be realized with a reduced number of gyroscopes and thus reduced cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of measuring the velocity of a vehicle, comprising the steps of:
   (1) storing an acceleration measurement received from an accelerator and route guidance information (RGI) data for route guidance of the vehicle, received from an external information server, to use to determine an irregularity constant of the accelerator;
   (2) determining whether the vehicle is in a stationary state by analyzing the acceleration measurement and calculating the inclination angle of a road on which the vehicle is traveling using a plurality of three-dimensional shape points included in the RGI data if the vehicle is not in the stationary state;
   (3) compensating for a gravity acceleration component from the acceleration measurement using the road inclination angle; and
   (4) calculating the velocity of the vehicle using the compensated acceleration measurement.

2. The method of claim 1, wherein step (2) further comprises the step of determining that the vehicle is in the stationary state if an acceleration measurement $f_c$ at a predetermined time point is equal to a previous acceleration measurement $f_{pre}$ and the number of successive occurrences of $f_c$ is equal to or greater than a predetermined value.

3. The method of claim 1, wherein step (2) further comprises the steps of:
   determining a current position of the vehicle on the RGI data;
   determining whether the present position of the vehicle matches with any of a plurality of shape points included in the RGI data; and
   calculating a road inclination angle between the shape point and a previous shape point, if the present position of the vehicle matches any of the shape points.

4. The method of claim 3, wherein step (2) further comprises the step of calculating a road inclination angle between left and right shape point of the present position of the vehicle, if the present position of the vehicle matches with none of the shape points.

5. The method of claim 3, wherein the step of calculating the road inclination angle further comprises the steps of:
   calculating a movement distance d(x, y) on an x-y plane and a movement distance dz along a z axis from a first shape point $(x_1, y_1, z_1)$ and a second shape point $(x_2, y_2, z_2)$ by which the road inclination angle is calculated; and
   calculating the road inclination angle θ by computing d(x, y) and dz according to $$\theta = \pm \arctan\left(\frac{(z_2 - z_1)}{\sqrt{(x_2 - x_1)^2 + (y_2 - y_1)^2}}\right).$$

6. The method of claim 4, wherein the step of calculating the road inclination angle further comprises the steps of:
   calculating a movement distance d(x, y) on an x-y plane and a movement distance dz along a z axis from a first shape point $(x_1, y_1, z_1)$ and a second shape point $(x_2, y_2, z_2)$ by which the road inclination angle is calculated; and
   calculating the road inclination angle θ by computing d(x, y) and dz according to $$\theta = \pm \arctan\left(\frac{(z_2 - z_1)}{\sqrt{(x_2 - x_1)^2 + (y_2 - y_1)^2}}\right).$$

7. The method of claim 1, wherein step (3) further comprises the step of calculating the gravity acceleration component included in the acceleration measurement using the road inclination angle and eliminating the gravity acceleration component from the acceleration measurement.

8. An apparatus for measuring the velocity of a vehicle, comprising:
   an acceleration measurer for measuring a current acceleration of the vehicle through an accelerator mounted on the vehicle;
   an acceleration storage for storing an acceleration measurement received from the acceleration measurer according to measured time;
   a gravity acceleration compensator for calculating the inclination angle of a road on which the vehicle is traveling using a plurality of three-dimensional shape points included in RGI data received from an external server and compensating for a gravity acceleration component from the acceleration measurement using the road inclination angle; and
   a velocity calculator for calculating the velocity of the vehicle using the compensated acceleration measurement.

9. The apparatus of claim 8, wherein the gravity acceleration compensator determines a present position of the vehicle on the RGI data, determines whether the present position of the vehicle matches with any of a plurality of shape points included in the RGI data, selecting a plurality of shape points according to the determination result, and calculating a road inclination angle between the shape points.

10. The apparatus of claim 9, wherein the gravity acceleration compensator calculates a road inclination angle between the shape point and a previous shape point, if the present position of the vehicle matches with any of the shape points.

11. The apparatus of claim 9, wherein the gravity acceleration compensator calculates a road inclination angle between left and right shape point of the present position of the vehicle, if the present position of the vehicle matches with none of the shape points.

12. The apparatus of claim 9, wherein the gravity acceleration compensator calculates a movement distance $d(x, y)$ on an x-y plane and a movement distance $dz$ along a z axis from a first shape point $(x_1, y_1, z_1)$ and a second shape point $(x_2, y_2, z_2)$ by which the road inclination angle is calculated, and calculates the road inclination angle $\theta$ by computing $d(x, y)$ and $dz$ according to $$\theta = \pm \arctan\left(\frac{(z_2 - z_1)}{\sqrt{(x_2 - x_1)^2 + (y_2 - y_1)^2}}\right). \tag{13}$$

13. The apparatus of claim 8, wherein the gravity acceleration compensator calculates the gravity acceleration component included in the acceleration measurement using the road inclination angle and eliminates the gravity acceleration component from the acceleration measurement.

* * * * *